United States Patent
Dean et al.

(10) Patent No.: US 6,532,520 B1
(45) Date of Patent: Mar. 11, 2003

(54) METHOD AND APPARATUS FOR ALLOCATING DATA AND INSTRUCTIONS WITHIN A SHARED CACHE

(75) Inventors: Alvar A. Dean, Essex Junction, VT (US); Marc R. Faucher, South Burlington, VT (US); John W. Goetz, Underhill, VT (US); Kenneth J. Goodnow, Essex Junction, VT (US); Paul T. Gutwin, Williston, VT (US); Stephen W. Mahin, Underhill, VT (US); Wilbur D. Pricer, Charlotte, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/394,965

(22) Filed: Sep. 10, 1999

(51) Int. Cl.$^7$ ............................................... G06F 12/00
(52) U.S. Cl. ........................ 711/133; 711/123; 711/130; 711/136; 711/159; 711/160
(58) Field of Search ................................. 711/122, 123, 711/125, 126, 130, 133, 136, 159, 160

(56) References Cited

U.S. PATENT DOCUMENTS

| | | | |
|---|---|---|---|
| 4,947,319 A | | 8/1990 | Bozman .................... 711/118 |
| 5,043,885 A | * | 8/1991 | Robinson ................... 711/133 |
| 5,224,217 A | | 6/1993 | Zangenehpour ............ 711/136 |
| 5,241,664 A | | 8/1993 | Ohba et al. ................ 711/121 |
| 5,394,531 A | | 2/1995 | Smith ........................ 711/136 |
| 5,542,062 A | | 7/1996 | Taylor et al. .................. 711/3 |
| 5,893,150 A | * | 4/1999 | Hagersten et al. .......... 711/139 |
| 5,968,168 A | * | 10/1999 | Kato ......................... 712/228 |
| 6,125,433 A | * | 9/2000 | Horstmann et al. ......... 711/160 |

OTHER PUBLICATIONS

John T.Robinson et al., Data Cache Management Using Frequency–Based Replacement, ACM, 1990, pp. 135–136.*

* cited by examiner

Primary Examiner—Reginald G. Bragdon
Assistant Examiner—Pierre M. Vital
(74) Attorney, Agent, or Firm—Schmeiser, Olsen & Watts; Eugene I. Shkurko (57) ABSTRACT

A method and apparatus are provided for managing cache allocation for a plurality of data types in a unified cache having dynamically allocable lines for first type data and for second type data. Cache allocation is managed by counting misses to first type data and misses to second type data in the unified cache, and by determining when a difference between a number of first type data misses and a number of second type data misses crosses a preselected threshold. A replacement algorithm of the unified cache then is adjusted in response to the detected crossing of the preselected threshold, the adjusting step including increasing a replacement priority of the first type data lines in the cache. The replacement algorithm preferably is an LRU algorithm wherein the adjusting step includes incrementing an age indication of the first type data lines. Hardware for implementing the inventive cache allocation management method comprises a miss counter configured to increment its count in response to a miss to first type data signal on a first counter input and to output a first logic state on a first counter output when the counter's count exceeds a first predetermined count. A priority adjustment circuit coupled to the first counter output increases the replacement priority of the first type data relative to the replacement priority of the second type data in response to the first logic state output by the miss counter.

25 Claims, 6 Drawing Sheets

METHOD AND APPARATUS FOR ALLOCATING DATA AND INSTRUCTIONS WITHIN A SHARED CACHE

FIELD OF THE INVENTION

The present invention relates to cache memories and more specifically to a method and apparatus for allocating data and instructions within a shared cache.

BACKGROUND OF THE INVENTION

Processor cache architecture schemes generally follow one of two models: a split cache model or a shared (unified) cache model. In a split cache model, two distinct first level caches are provided, a first cache for data and a second cache for instructions. The disadvantage of this architecture is that some applications are heavily weighted toward either data or instructions. In these situations, a split cache effectively excludes a large portion of the total cache capacity from use (e.g., either the data cache or the instruction cache, depending on the weighting of the application), and therefore makes highly inefficient use of cache resources.

In a shared cache both data and instructions inhabit a single cache, and the continued residency of data and instructions within the cache is managed by a single replacement algorithm. For example, a commonly employed replacement algorithm is a "least-recently-used" (LRU) algorithm that assigns an "age" to each line within the single data and instruction cache. As new data is loaded into a line of the cache, or as a new cache line is accessed, the cache line is assigned the youngest cache line age while all other lines within the cache are aged. When a cache line needs to be discarded, the cache line having the oldest cache line age associated therewith is replaced.

In practice, actual implementations of the LRU algorithm rely upon incomplete retained data on actual cache usage (e.g., there are simply too many lines in a typical cache to maintain a complete set of statistics on the use of each cache line and there is too little time available during cache operations to evaluate a complete set of cache line use statistics). Therefore, actual cache line replacements are made on a partially random basis.

For "distributed statistics" (wherein the shared cache contains a similar number of data and instruction cache lines with similar ages), the LRU algorithm functions well. However, for non-distributed statistics (wherein the shared cache contains a non-similar number of data and instruction cache lines having non-similar ages), the LRU algorithm often maintains a non-optimal balance between the number of data and instruction lines within a shared cache. Accordingly, a need exists for an improved method and apparatus for allocating data and instructions within a shared cache.

SUMMARY OF THE INVENTION

To overcome the needs of the prior art, an inventive method and apparatus are provided for managing cache allocation for a plurality of data types in a unified cache having dynamically allocable lines for first type data (e.g., data/instructions) and for second type data (e.g., instructions/data). Cache allocation is managed by counting misses to first type data and misses to second type data in the unified cache, and by determining when a difference between a number of first type data misses and a number of second type data misses crosses a preselected threshold. A replacement algorithm of the unified cache then is adjusted in response to the detected crossing of the preselected threshold, the adjusting step including increasing a replacement priority of the first type data lines in the cache. The replacement algorithm preferably is an LRU algorithm wherein the adjusting step includes incrementing an age indication of the first type data lines. To re-balance the count of misses to first type data and the count of misses to second type data (e.g., during a new task), preferably the count of misses to first type data and the count of misses to second type data are reset after a predetermined time period or in response to a new task.

Hardware for implementing the inventive cache allocation management method comprises a miss counter having a first counter input adapted to couple to the control logic of the unified cache and to receive a miss to first type data signal therefrom, a second counter input adapted to couple to the control logic of the unified cache and to receive a miss to second type data signal therefrom and a first counter output. The miss counter is configured to increment its count in response to a miss, to first type data signal on the first counter input and to output a first logic state on the first counter output when its count exceeds a first predetermined count. A priority adjustment circuit is coupled to the first counter output of the miss counter and is adapted to couple to the replacement algorithm logic of the unified cache. The priority adjustment circuit is configured to increase the replacement priority of the first type data relative to the replacement priority of the second type data in response to the first logic state output by the miss counter on the first counter output.

Preferably the miss counter is further adapted to decrement its count in response to a miss to second type data signal on the second counter input and to output a second logic state on the first counter output when its count is equal to or less than the first predetermined count. The priority adjustment circuit thereby may be configured to increase the replacement priority of the second type data relative to the replacement priority of the first type data in response to the second logic state output by the miss counter on the first counter output. The priority adjustment circuit preferably comprises an LRU priority adjustment circuit configured to inhibit aging of at least a portion of first/second type data within the unified cache by an LRU algorithm of the cache when the second/first logic state is output by the miss counter. Preferably the miss counter's count is resettable and/or presettable, the response rate of the miss counter to misses to first type data and/or misses to second type data is adjustable, and an upper and a lower count threshold may be set to limit the count range of the miss counter.

By monitoring the ratio of misses to first type data to misses to second type data, and by adjusting the percentage of the unified cache dedicated to each type data based thereon, a unified cache's hit rate is significantly improved. Further, cache hit rate improvement is achieved with a minimal increase in cache circuitry complexity.

Other objects, features and advantages of the present invention will become more fully apparent from the following detailed description of the preferred embodiments, the appended claims and the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENTS

Figure 1:
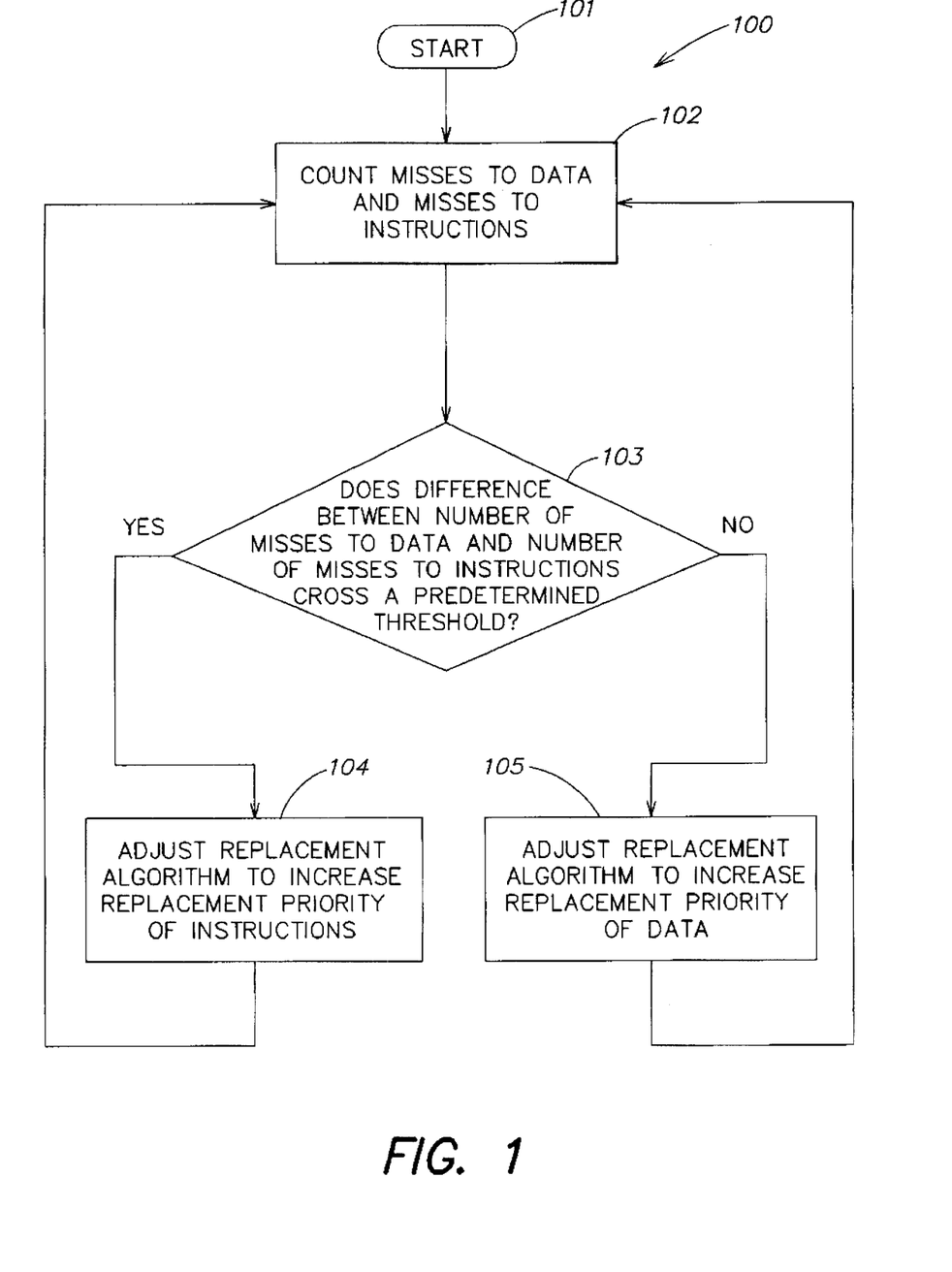
FIG. 1 is a flowchart of an inventive method for managing cache allocation between data and instructions in a unified cache in accordance with the present invention.

FIG. 1 is a flowchart of an inventive method for managing cache allocation between data and instructions in a unified cache ("inventive cache management method 100") in accordance with the present invention. The inventive cache management method 100 begins at step 101.

In step 102, misses to data and misses to instructions within a unified cache (not shown) are counted.

Thereafter, in step 103, a determination is made as to whether the difference between the number of misses to data and the number of misses to instructions within the cache crosses (e.g., exceeds or falls below) a predetermined threshold (e.g., a predetermined count as described below with reference to FIG. 2). If so, in step 104, a replacement algorithm that governs the replacement of data and instructions within the unified cache (not shown) is adjusted to increase the replacement priority of instructions within the cache relative to the replacement priority of data within the cache; otherwise if the difference does not cross the predetermined threshold, in step 105, the replacement algorithm is adjusted to increase the replacement priority of data within the cache relative to the replacement priority of instructions within the cache. Following either step 104 or 105, counting of misses to data and misses to instructions continues in step 102 as shown.

Adjustment of the replacement algorithm for the unified cache may be performed by many techniques. For example, if a least-recently-used (LRU) replacement algorithm is employed, in step 104, the "age" of each instruction cache line may be increased while the age of each data cache line is not increased, or in step 105, the age of each data cache line may be increased while the age of each instruction cache line is not increased. However, when an LRU replacement algorithm is employed, preferably the LRU replacement algorithm is adjusted in step 104 by prohibiting the replacement of data cache lines while allowing the replacement of instruction cache lines, and in step 105 by prohibiting the replacement of instruction cache lines while allowing the replacement of data cache lines as described below with reference to FIG. 2.

Figure 2:
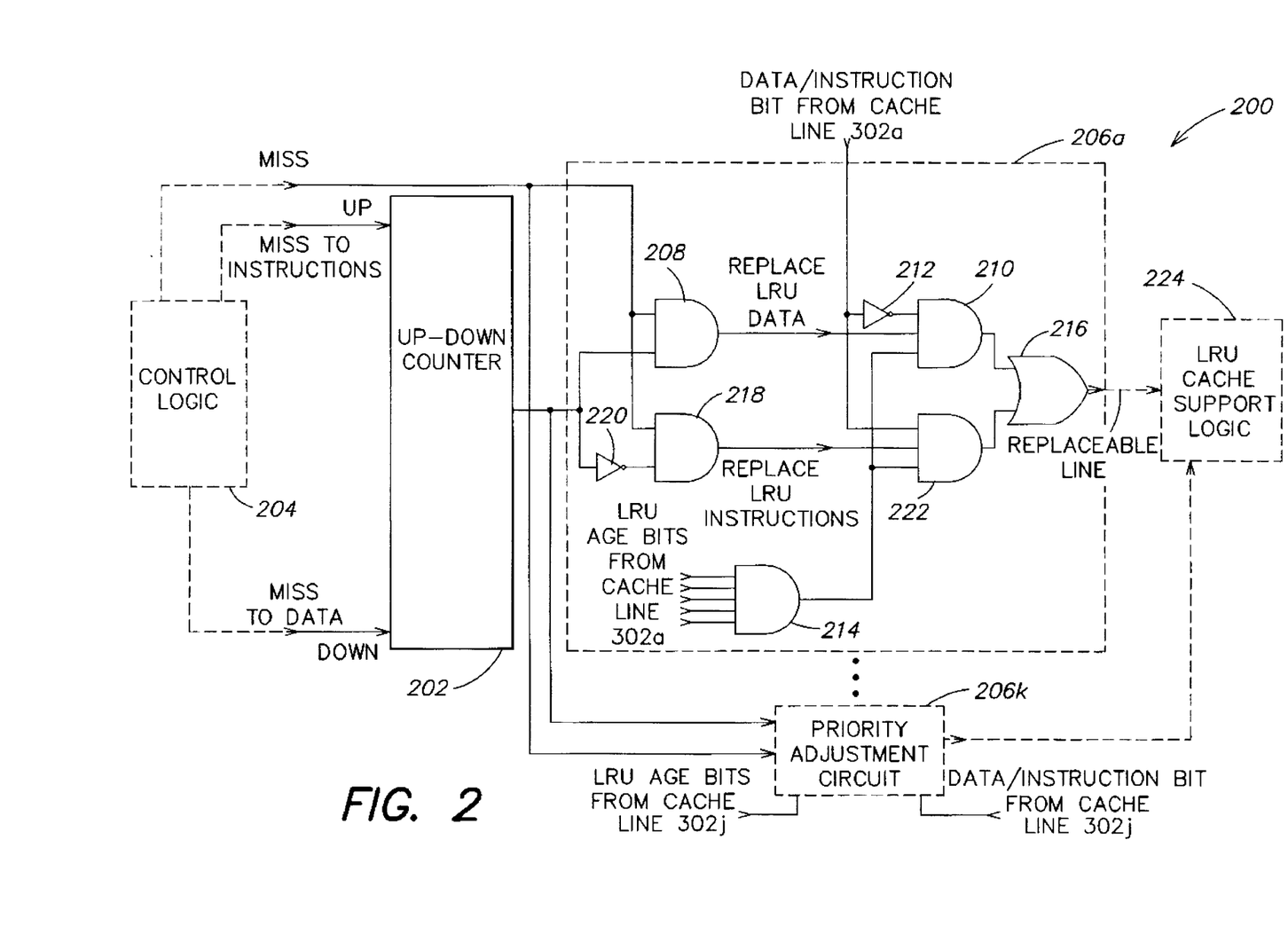
FIG. 2 is a schematic diagram of a first cache management circuit for implementing the inventive cache management method of FIG. 1.

FIG. 2 is a schematic diagram of a first cache management circuit 200 for implementing the inventive cache management method 100 of FIG. 1. The first cache management circuit 200 is configured to operate with a unified cache 300 (shown in FIG. 3) having a plurality of cache lines 302a–k. Each cache line has a plurality of data or instruction bits 304, a plurality of LRU age bits 306 and a data/instruction bit 308 which designates the cache line as either a data line (e.g., by a logic 0) or an instruction line (e.g., by a logic 1) as described further below.

Figure 3:
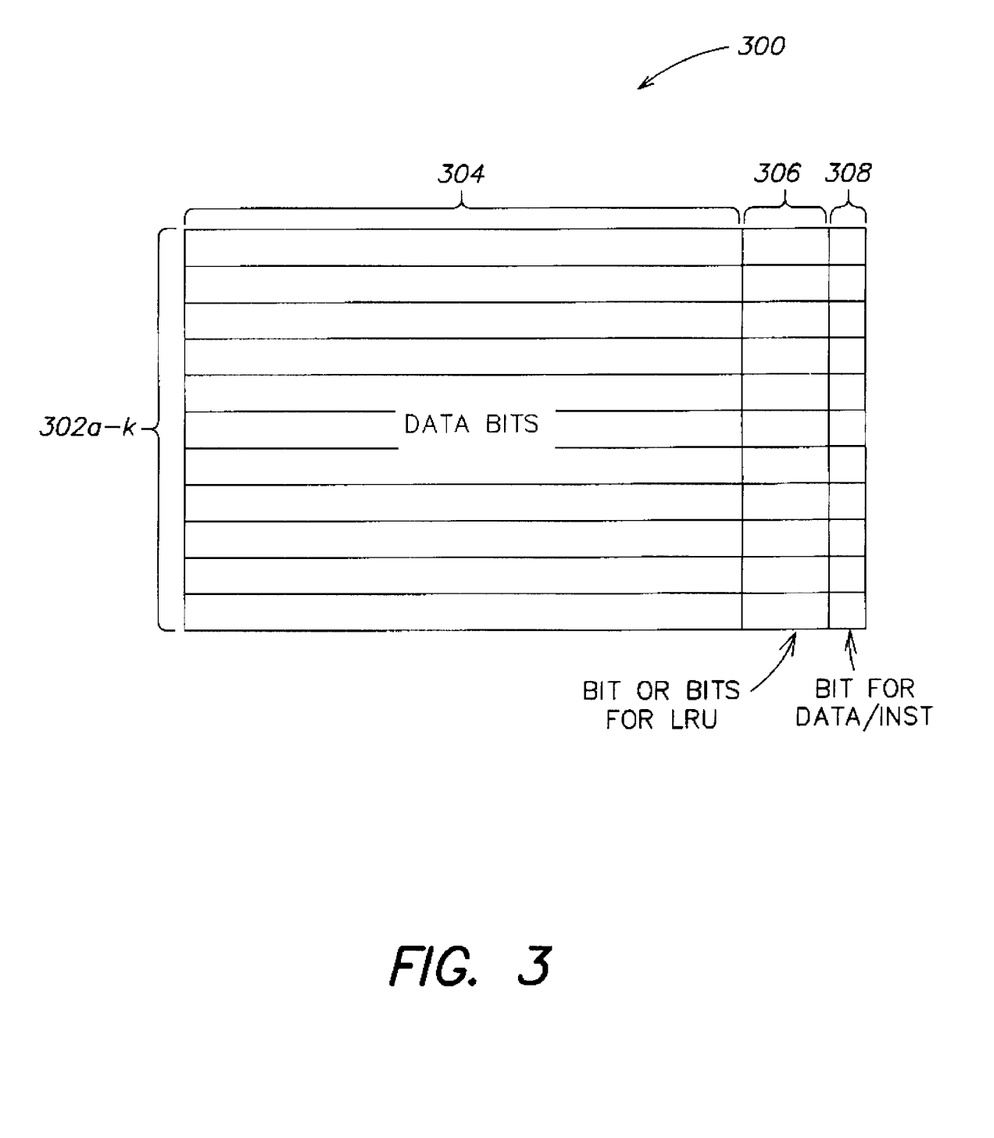
FIG. 3 is a schematic diagram of a unified cache configured for use with the inventive cache management method of FIG. 1.

The first cache management circuit 200 comprises in pertinent part an up-down counter 202 having a first input coupled to a miss to instructions output of control logic 204 (shown in phantom) of the unified cache 300, a second input coupled to a miss to data output of the control logic 204 and an output coupled to a plurality of priority adjustment circuits 206a–k. The up-down counter 202 may comprise any conventional up-down counter 202 such as a National Semiconductor 54AC191 4-bit up/down counter, a Fairchild Semiconductors™ DM74LS469A 8-bit up/down counter, etc.

Each priority adjustment circuit 206a–k is configured identically to the priority adjustment circuit 206a shown in FIG. 2, but receives its cache line inputs from a corresponding cache line 302a–k of the unified cache 300. For example, priority adjustment circuit 206a receives as inputs information from cache line 302a, priority adjustment circuit 206b receives as inputs information from cache line 302b, etc. For convenience, only the details of priority adjustment circuit 206a are described herein.

The priority adjustment circuit 206a comprises a first AND gate 208 having a first input coupled to the output of the up-down counter 202, a second input coupled to a miss output of the control logic 204 and an output coupled to a first input of a second AND gate 210. The second AND gate 210 has a second input configured to receive the data/instruction bit 308 of cache line 302a (of the unified cache 300) via a first inverter 212, a third input coupled to an output of a third AND gate 214 and an output coupled to a first input of an OR gate 216. The third AND gate 214 has a plurality of inputs configured to receive the LRU age bits 306 from the cache line 302a of the unified cache 300.

The priority adjustment circuit 206a further comprises a fourth AND gate 218 having a first input coupled to the output of the up-down counter 202 via a second inverter 220, a second input coupled to the miss output of the control logic 204 and an output coupled to a first input of a fifth AND gate 222. The fifth AND gate 222 has a second input configured to receive the data/instruction bit 308 of the cache line 302a of the unified cache 300, a third input coupled to the output of the third AND gate 214 and an output coupled to a second input of the OR gate 216. The output of the OR gate 216 is coupled to LRU cache support logic 224.

The LRU cache support logic 224 is configured to replace the data or instructions stored in the cache line 302a of the unified cache 300 with new data or instructions in response to an appropriate logic level output by the OR gate 216. The LRU cache support logic 224 also is configured to replace the data or instructions stored in each cache line 302b–k with new data or instructions in response to an appropriate logic level output by an OR gate (not shown) of each priority adjustment circuit 206b–k. Note that LRU cache support logic (such as the LRU cache support logic 224) for replacing data or instructions stored in cache lines is well known in the art and is not described further herein.

In operation, the up-down counter 202 is set to a predetermined count (e.g., 64 for a 128 count counter), and thereafter counts the number of misses to data and the number of misses to instructions generated as the unified cache 300 is accessed. Specifically, for each miss to data signal generated by the control logic 204, the up-down counter 202's count is decremented and for each miss to instruction signal generated by the control logic 204, the up-down counter 202's count is incremented. Thus, the count of the up-down counter 202 effectively measures the difference between the number of misses to data and the number of misses to instructions associated with the unified cache 300.

The up-down counter 202 is provided with a count threshold (e.g., preferably selectable/programmable as described below) such that when the count of the up-down counter 202 exceeds the count threshold, a first logic state (e.g., a logic 1) is output by the up-down counter 202. When the count of the up-down counter 202 is equal to or less than the count threshold, a second logic state (e.g., a logic 0) is output by the up-down counter 202. Accordingly, if more misses to instructions occur than misses to data, the up-down counter 202 outputs a high logic level, and if more misses to data occur than misses to instructions, the up-down counter 202 outputs a low logic level.

In a conventional LRU algorithm for managing cache allocation, each time a miss to cache occurs, the control logic 204 generates a miss to cache signal and either a miss to instructions or a miss to data signal, and the age of the cache lines within the unified cache 300 are aged (e.g., by adjusting the LRU age bits 306) as is known in the art. To determine which cache line or lines to replace, the age of each cache line 302a–k is examined, and the oldest cache line is replaced (e.g., a cache line having high logic levels for each LRU age bit). However, in accordance with the inventive cache management method 100, when a miss to cache occurs, the particular cache line or lines replaced within the unified cache 300 depends on the count of the up-down counter 202.

Assuming more misses to instructions than misses to data have occurred, the up-down counter 202 outputs a high logic level. In response thereto the first AND gate 208 of each priority adjustment circuit 206a–k outputs a high logic level (a "REPLACE LRU DATA" signal) to the second AND gate 210, and the fourth AND gate 218 outputs a low logic level to the fifth AND gate 222.

With reference to the priority adjustment circuit 206a, if the LRU bits 306 of the cache line 302a are other than all high logic levels, the third AND gate 214 outputs a low logic level, as do the second AND gate 210, the fifth AND gate 222 and the OR gate 216 so as to prevent the LRU cache support logic 224 from replacing the cache line 302a. However, if the LRU bits 306 of the cache line 302a are all high logic levels, the cache line 302a may be eligible for replacement. For example, if the first cache line 302a contains data (e.g., as indicated by a low logic level for the data/instruction bit 308 of the first cache line 302a), with the output of the first AND gate 208 high (due to more misses to instructions than misses to data occurring so as to generate a high logic level at the output of the up-down counter 202 as described), the second AND gate 210 outputs a high logic level. In response thereto, the OR gate 216 outputs a high logic level to the LRU cache support logic 224, and the LRU cache support logic 224 treats the cache line 302a as replaceable.

Note that with the output of the up-down counter 202 high, the fifth AND gate 222 is effectively disabled so that if the cache line 302a is an instruction cache line (as indicated by a high logic level value for the data/instruction bit 308) having all high logic level LRU age bits 306 (e.g., the oldest age), the OR gate 216 is unable to generate a high logic level and the LRU cache support logic 224 is precluded from replacing the cache line 302a. The allocation of cache resources of the unified cache 300 thereby is biased toward instructions. The priority adjustment circuits 206b–k operate similarly to determine the replaceability of cache lines 302b–k, respectively.

If more misses to data occur than misses to instructions, the count of the up-down counter 202 falls below the count threshold and the up-down counter 202 outputs a low logic level. In response thereto, the first AND gate 208 of each priority adjustment circuit 206a–k outputs a low logic level to the second AND gate 210 while the fourth AND gate 218 of each priority adjustment circuit 206a–k outputs a high logic level (a "REPLACE LRU INSTRUCTIONS" signal) to the fifth AND gate 222. With the output of the first AND gate 208 low, the output of the second AND gate 210 is forced low so that data cache lines (e.g., cache lines having a low logic level for data/instruction bit 308) may not be replaced by the LRU cache support logic 224. However, with the output of the fourth AND gate 218 high, instruction cache lines (e.g., cache lines having a high logic level for data/instruction bit 308) that have high logic level LRU age bits 306 are designated as replaceable via a high logic level output by the fifth AND gate 222 to the OR gate 216 and by the OR gate 216 to the LRU cache support logic 224. In this manner, allocation of the unified cache 300's resources is biased toward data.

Figure 4:
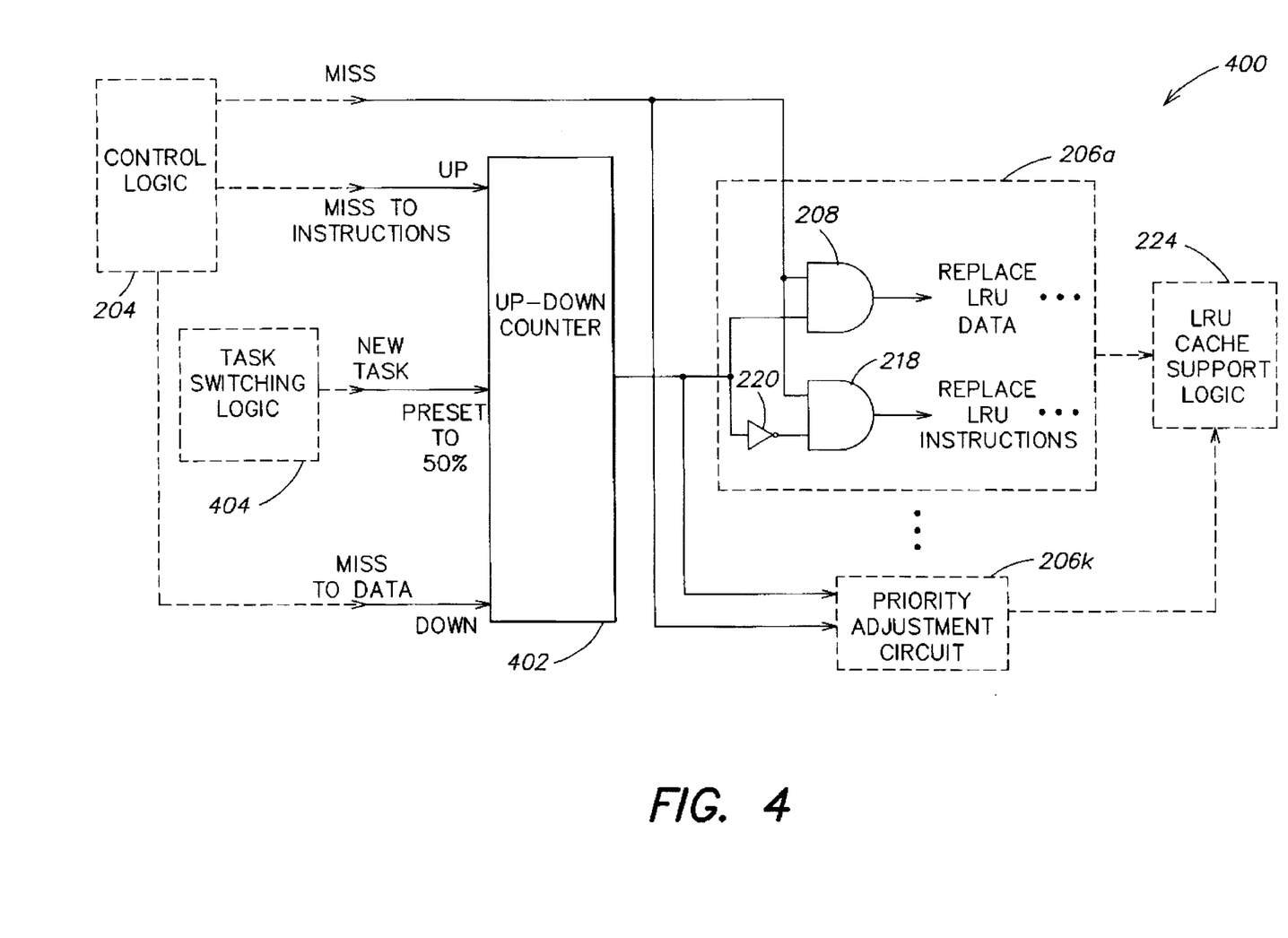
FIG. 4 is a schematic diagram of a second cache management circuit for implementing the inventive cache management method of FIG. 1.

FIG. 4 is a schematic diagram of a second cache management circuit 400 for implementing the inventive cache management method 100 of FIG. 1. The second cache management circuit 400 is identical to the first cache management circuit 200 of FIG. 2 with the exception that the up-down counter 202 is replaced with an up-down counter 402 having a preset input coupled to task switching logic 404 of a microprocessor (not shown) employing the unified cache 300 of FIG. 3. The task switching logic 404 generates a new task signal in response to each new task performed within the microprocessor (as is known in the art) and supplies the new task signal to the preset input of the up-down counter 402. In response thereto, the count of the up-down counter 402 is preset to a default condition, such as 50% of the full scale value of the counter. Any other default count may be employed, and the up-down counter 402 preferably is configured to allow any default value to be programmably provided via the preset input. Alternatively, the up-down counter 402 may be preset automatically after a predetermined time period. Old hit/miss statistics for data and instructions which typically are in applicable or undesirably skew cache allocation for new applications thereby are reset at least periodically, but preferably at the beginning of each new task.

Figure 5A:
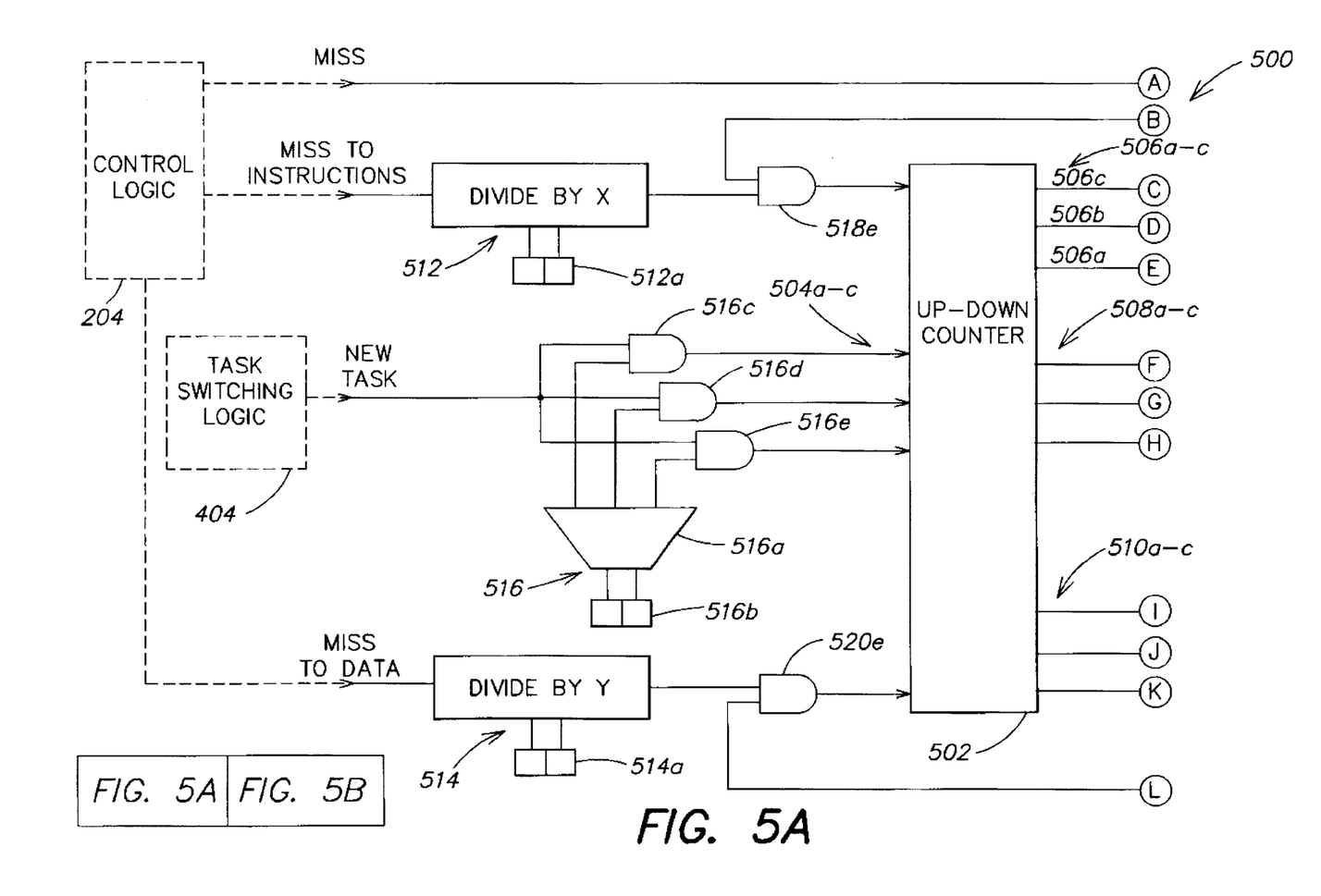
FIG. 5 is schematic diagram of a third cache management circuit for implementing the inventive cache management method of FIG. 1.
Figure 5B:
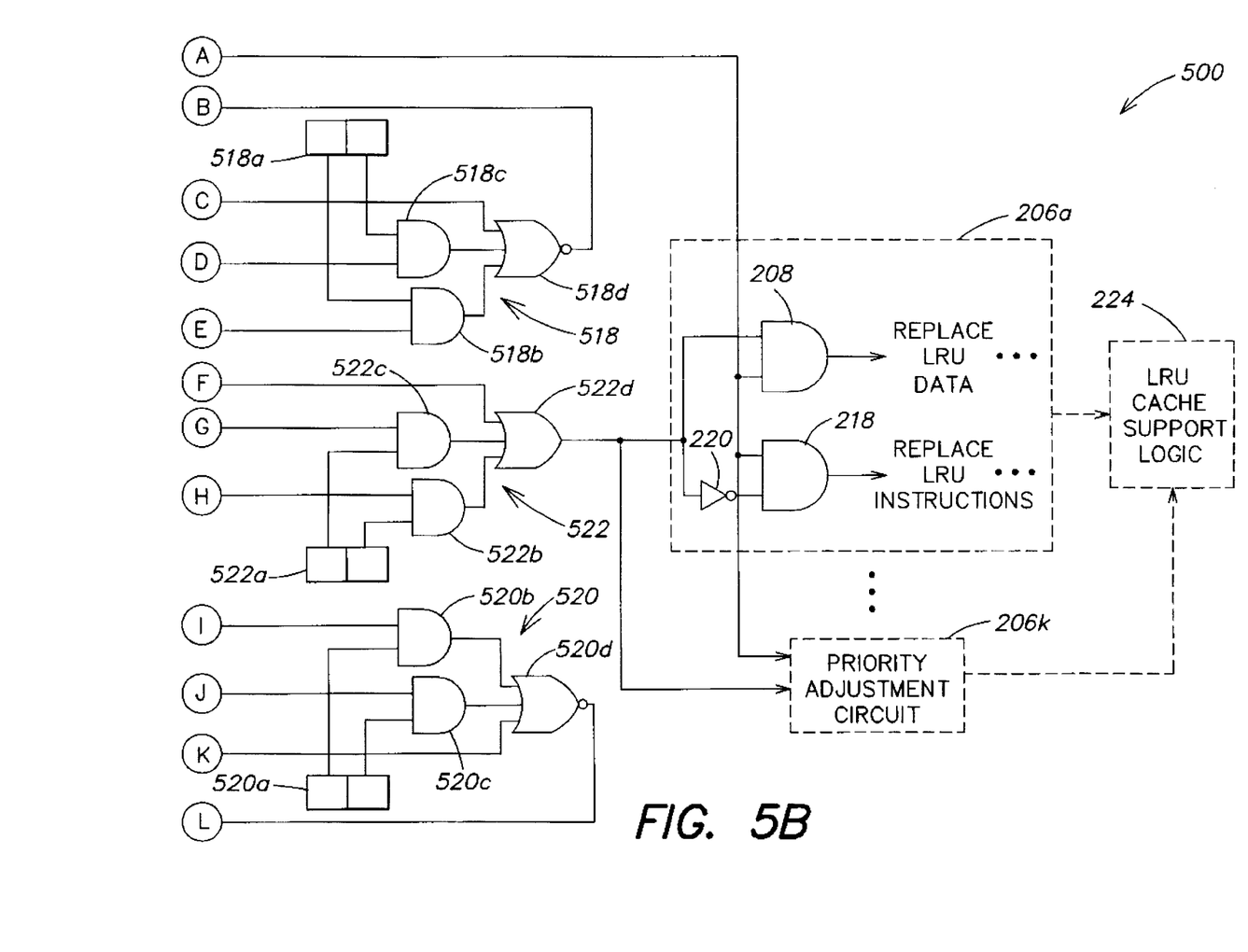

FIG. 5 is a schematic diagram of a third cache management circuit 500 for implementing the inventive cache management method 100 of FIG. 1. The third cache management circuit 500 is similar to the first cache management circuit 200 of FIG. 2 and to the second cache management circuit 400 of FIG. 4. However, unlike the first cache management circuit 200 and the second cache management circuit 400, the third cache management circuit 500 comprises an up-down counter 502 having a plurality of preset inputs 504a–c, a plurality of upper-count threshold taps 506a–c, a plurality of mid-count threshold taps 508a–c and a plurality of lower-count threshold taps 510a–c. The third cache management circuit 500 further comprises a first adjustable divide-by circuit 512 coupled between the control logic 204 and a count increment input of the up-down counter 502, a second adjustable divide-by circuit 514 coupled between the control logic 204 and a count decrement input of the up-down counter 502 and an adjustable preset circuit 516 coupled between the task switching logic 404 and the preset inputs 504a–c. A first adjustable stop circuit 518 is coupled to the upper-count threshold taps 506a–c and to the count increment input of the up-down counter 502, a second adjustable stop circuit 520 is coupled between the lower-count threshold taps 510a–c and to the count, decrement input of the up-down counter 502, and an adjustable tap selection circuit 522 is coupled between the mid-count threshold taps 508a–c of the up-down counter 502 and the priority adjustment circuits 206a–k.

In operation, the first adjustable divide-by circuit 512 divides the miss to instructions signal output by the control logic 204 by a predetermined divide-by value stored within registers 512a. Preferably, the predetermined divide-by value is programmable by writing the binary equivalent of the desired divide-by value to the registers 512a. The response rate of the up-down counter 502 to the miss to instructions signal from the control logic 204 thereby is adjustable. The second adjustable divide-by circuit 514 operates similarly with regard to the miss to data signal output by the control logic 204, allowing the response rate of the up-down counter 502 to the miss to data signal to be adjusted by a predetermined and preferably programmable divide-by value stored within registers 514a of the second adjustable divide-by circuit 514.

The preset circuit 516 supplies the up-down counter 502 with user selectable values for the plurality of upper, mid and lower count thresholds of the up-down counter 502 in response to a new task signal from the task switching logic 404. Specifically, the preset circuit 516 contains a register file 516a that stores "sets" of preset values for the upper, mid and lower count thresholds of the up-down counter 502, and the particular set of threshold values loaded into the up-down counter 502 (in response to a new task signal from the task switching logic 404) is selected by the contents of registers 516b of the preset circuit 516.

Preferably both the register file 516a and the registers 516b are programmable to allow any desired count threshold values to be loaded into the up-down counter 502. AND gates 516c–e are provided to prevent the contents of the register file 516a from affecting the up-down counter 502's count thresholds when a new task signal is not present.

The first adjustable stop circuit 518 detects when the count of the up-down counter 502 reaches one of its upper-count thresholds and in response thereto generates a stop signal that gates off the miss to instructions signal from the control logic 204 so as to prevent further increases of the up-down counter 502's count. In this manner, the count of the up-down counter 502 is prevented from reaching a level during "heavy" instructions cycles that altogether eliminates cache allocation for data.

The first adjustable stop circuit 518 comprises registers 518a coupled to a first AND gate 518b and to a second AND gate 518c that select which of the upper-count threshold taps to monitor. For example, if the registers 518a contain (0,0), the first AND gate 518b gates off the first upper-count threshold tap 506a, the second AND gate 518c gates off the second upper-count threshold tap 506b and the third upper-count threshold tap 506c (e.g., the tap having the highest upper-count threshold) controls the operation of the first adjustable stop circuit 518. Likewise, if a high logic level is supplied to either the first AND gate 518b or to the second AND gate 518c, the first upper-count threshold tap 506b or the second upper-count threshold tap 506c, respectively, will control the operation of the first adjustable stop circuit 518. That is, when the up-down counter 502 reaches the upper-count threshold associated with the selected upper-count threshold tap, a high logic level is generated on the tap and is supplied to a NOR gate 518d. In response thereto, the NOR gate 518d generates a low logic level that gates off the miss to instructions signal (supplied from the control logic 204) via a third AND gate 518e. Preferably the registers 518a are programmable.

The second adjustable stop circuit 520 functions similarly to the first adjustable stop circuit 518 by selecting one of the lower-count thresholds of the up-down counter 502 and by preventing the count of the up-down counter 502 from falling below the selected count threshold. The second adjustable stop circuit 520 employs registers 520a, first AND gate 520b and second AND gate 520c to select which of the lower-count threshold taps 510a–c will control the second adjustable stop circuit 520; and the selected lower-count threshold tap supplies a high logic level to a NOR gate 520d so as to gate the miss to data signal (supplied from the control logic 204) via a third AND gate 520e.

The adjustable tap selection circuit 522 employs similar register/gate logic (e.g., registers 522a and first and second AND gates 522b, 522c) to select which of the mid-count threshold taps 508a–c passes a high logic level (via an OR gate 522d) to the priority adjustment circuits 206a–k when the selected tap's mid-count threshold is exceeded. In this manner, the count threshold that determines whether to weight cache allocation toward instructions or data is adjustable (and preferably programmable).

The foregoing description discloses only the preferred embodiments of the invention, modifications of the above disclosed apparatus and method which fall within the scope of the invention will be readily apparent to those of ordinary skill in the art. For instance, the specific type of logic gates described herein are merely preferred and any functionally equivalent logic gates may be similarly employed.

Accordingly, while the present invention has been disclosed in connection with the preferred embodiments thereof, it should be understood that other embodiments may fall within the spirit and scope of the invention, as defined by the following claims.

The invention claimed is:

1. A method of managing cache allocation for a plurality of data types in a unified cache having dynamically allocable lines for first type data and for second type data, comprising:
   counting misses to first type data and misses to second type data in the unified cache;
   detecting when a difference between a number of first type data misses and a number of second type data misses crosses a preselected threshold; and
   adjusting a replacement algorithm of the unified cache in response to a detected crossing of the preselected threshold, said adjusting step including increasing a replacement priority of the first type data lines in the cache.

2. The method of claim 1 wherein said replacement algorithm is an LRU algorithm and said adjusting step further includes incrementing an age indication of said first type data lines.

3. The method of claim 1 wherein the first type data comprises data.

4. The method of claim 1 wherein the first type data comprises instructions.

5. The method of claim 1 further comprising resetting the count of misses to first type data and the count of misses to second type data after at least one of a predetermined time period and an onset of a new task.

6. The method of claim 1 wherein counting misses to first type data and misses to second type data comprises:

providing a miss counter having a predetermined count;
incrementing the miss counter's count in response to a miss to first type data; and
decrementing the miss counter's count in response to a miss to second type data; and
wherein detecting when a difference between a number of first type data misses and a number of second type data misses crosses a preselected threshold comprises detecting when the miss counter's count reaches a predetermined count threshold.

7. The method of claim 6 further comprising resetting the miss counter's count to a default condition after at least one of a predetermined time period and an onset of a new task.

8. The method of claim 6 further comprising adjusting the rate of response of the miss counter to misses to first type data.

9. The method of claim 8 wherein adjusting the rate of response of the miss counter to misses to first type data comprises dividing a miss to first type data signal supplied to the counter by a predetermined value.

10. The method of claim 8 further comprising adjusting the rate of response of the miss counter to misses to second type data.

11. The method of claim 1 further comprising retaining at least a portion of the unified cache for first type data and at least a portion of the unified cache for second type data.

12. Apparatus for managing cache allocation for a plurality of data types in a unified cache having dynamically allocable lines for first type data and for second type data, comprising:
   a miss counter having a count and including:
      a first counter input adapted to couple to control logic of the unified cache and to receive a miss to first type data signal therefrom;
      a second counter input adapted to couple to the control logic of the unified cache and to receive a miss to second type data signal therefrom; and
      a first counter output, wherein the miss counter is configured to increment its count in response to a miss to first type data signal on the first counter input and to output a first logic state on the first counter output when its count exceeds a first predetermined count; and
   a priority adjustment circuit coupled to the first counter output of the miss counter and adapted to couple to replacement algorithm logic of the unified cache, the priority adjustment circuit configured to increase the replacement priority of the first type data relative to the replacement priority of the second type data in response to the first logic state output by the miss counter on the first counter output.

13. The apparatus of claim 12 wherein the miss counter is further adapted to decrement its count in response to a miss to second type data signal on the second counter input and to output a second logic state on the first counter output when its count is equal to or less than the first predetermined count; and
   wherein the priority adjustment circuit is further configured to increase the replacement priority of the second type data relative to the replacement priority of the first type data in response to the second logic state output by the miss counter on the first counter output.

14. The apparatus of claim 13 wherein the priority adjustment circuit comprises an LRU priority adjustment circuit configured to inhibit aging of at least a portion of first type data within the unified cache by an LRU algorithm of the cache when the second logic state is output by the miss counter.

15. The apparatus of claim 13 wherein the miss counter further comprises at least one lower count threshold and at least one lower count threshold output; and
   wherein the apparatus further comprises a second stop circuit coupled to the second counter input and to the at least one lower count threshold output of the miss counter and adapted to monitor the count of the miss counter and to prevent the miss counter from responding to the miss to second type data signal if the count reaches the at least one lower count threshold.

16. The apparatus of claim 12 wherein the priority adjustment circuit comprises an LRU priority adjustment circuit configured to inhibit aging of at least a portion of second type data within the unified cache by an LRU algorithm of the cache when the first logic state is output by the miss counter.

17. The apparatus of claim 12 wherein the miss counter further comprises a preset input adapted to receive a preset signal and to set the count of the miss counter to a predetermined value in response thereto.

18. The apparatus of claim 17 wherein the count of the miss counter is programmable by supplying a desired count to the preset input of the miss counter.

19. The apparatus of claim 18 further comprising a count set circuit coupled to the preset input of the miss counter, the count set circuit configured to output at least one predetermined value to the preset input of the miss counter so as to set the count thereof to the at least one predetermined value.

20. The apparatus of claim 12 further comprising a response rate adjustment circuit coupled to the first counter input of the miss counter and adapted to reduce the response rate of the miss counter to the miss to first type data signal.

21. The apparatus of claim 20 wherein the response rate adjustment circuit comprises a divide-by circuit coupled to the first counter input of the miss counter and adapted to divide the miss to first type data signal by a predetermined divide-by value.

22. The apparatus of claim 21 wherein the predetermined divide-by value is programmable.

23. The apparatus of claim 12 wherein the miss counter further comprises at least one upper count threshold and at least one upper count threshold output; and
   wherein the apparatus further comprises a first stop circuit coupled to the first counter input and to the at least one upper count threshold output of the miss counter and adapted to monitor the count of the miss counter and to prevent the miss counter from responding to the miss to first type data signal if the count reaches the at least one upper count threshold.

24. The apparatus of claim 12 wherein the miss counter further comprises a second counter output and is further configured to output the first logic state on the second counter output when the miss counter's count exceeds a second predetermined count; and
   wherein the priority adjustment circuit is further coupled to the second counter output and is further configured to ignore the first logic state output on the miss counter's first counter output and to increase the replacement priority of the first type data relative to the replacement priority of the second type data in response to the first logic state output by the miss counter on the second counter output.

25. Apparatus for managing cache allocation for a plurality of data types in a unified cache having dynamically allocable lines for first type data and for second type data, comprising:

miss counter means having a count and including:
- a first counter input for coupling to control logic of the unified cache and for receiving a miss to first type data signal therefrom;
- a second counter input for coupling to the control logic of the unified cache and for receiving a miss to second type data signal therefrom; and
- a first counter output, wherein the miss counter means increments its count in response to a miss to first type data signal on the first counter input, decrements its count in response to a miss to second type data signal on the second counter input and outputs a first logic state on the first counter output when its count exceeds a first predetermined count; and priority adjustment means coupled to the first counter output of the miss counter means and for coupling to replacement algorithm logic of the unified cache, the priority adjustment means for increasing the replacement priority of the first type data relative to the replacement priority of the second type data in response to the first logic state output by the miss counter means on the first counter output.

* * * * *